(12) United States Patent
Hogan

(10) Patent No.: US 8,914,639 B2
(45) Date of Patent: Dec. 16, 2014

(54) METHOD AND APPARATUS FOR ONE-STEP SIGNATURE TRUST FOR DIGITALLY-SIGNED DOCUMENTS

(75) Inventor: Kevin Ainslee Hogan, Anaheim, CA (US)

(73) Assignee: Adobe Systems Incorporated, San Jose, CA (US)

( * ) Notice: Subject to any disclaimer, the term of this patent is extended or adjusted under 35 U.S.C. 154(b) by 127 days.

(21) Appl. No.: 13/458,046

(22) Filed: Apr. 27, 2012

(65) Prior Publication Data

US 2013/0290725 A1    Oct. 31, 2013

(51) Int. Cl.
*H04L 29/00*     (2006.01)
*H04L 9/28*      (2006.01)

(52) U.S. Cl.
CPC ....................................... *H04L 9/28* (2013.01)
USPC ........................................ 713/176; 713/157

(58) Field of Classification Search
CPC ....................................................... H04L 9/28
USPC ................................................. 713/157, 176
See application file for complete search history.

(56) References Cited

FOREIGN PATENT DOCUMENTS

EP      1293869 A2 *   3/2003

OTHER PUBLICATIONS

"How to tell if a digital signature is trustworthy" printed from web site http://.microsoft.com/en-us/word-help/how-to-tell-if-a-digital-signature-is-trustworthy-HA001230875.aspx#BM5 on Sep. 12, 2012, 6 pages.
"Digital signatures display a question mark and a "Validity Unknown" or "Signature not verified!" message" printed from web site http://nuance.custhelp.com/app/answers/detail/a_id/5518/related/1 on Sep. 12, 2012, 1 page.

* cited by examiner

*Primary Examiner* — Brandon Hoffman
*Assistant Examiner* — Michael D Anderson
(74) *Attorney, Agent, or Firm* — Moser Taboada

(57) ABSTRACT

A computer implemented method and apparatus for one-step signature trust of digitally signed documents comprising determining whether a digital signature is otherwise valid except for a lack of trust in a digital certificate; offering a recipient an option to establish trust in the digital certificate; and adding the digital certificate to a list of the recipient's trusted digital certificates when recipient opts to establish trust.

17 Claims, 7 Drawing Sheets

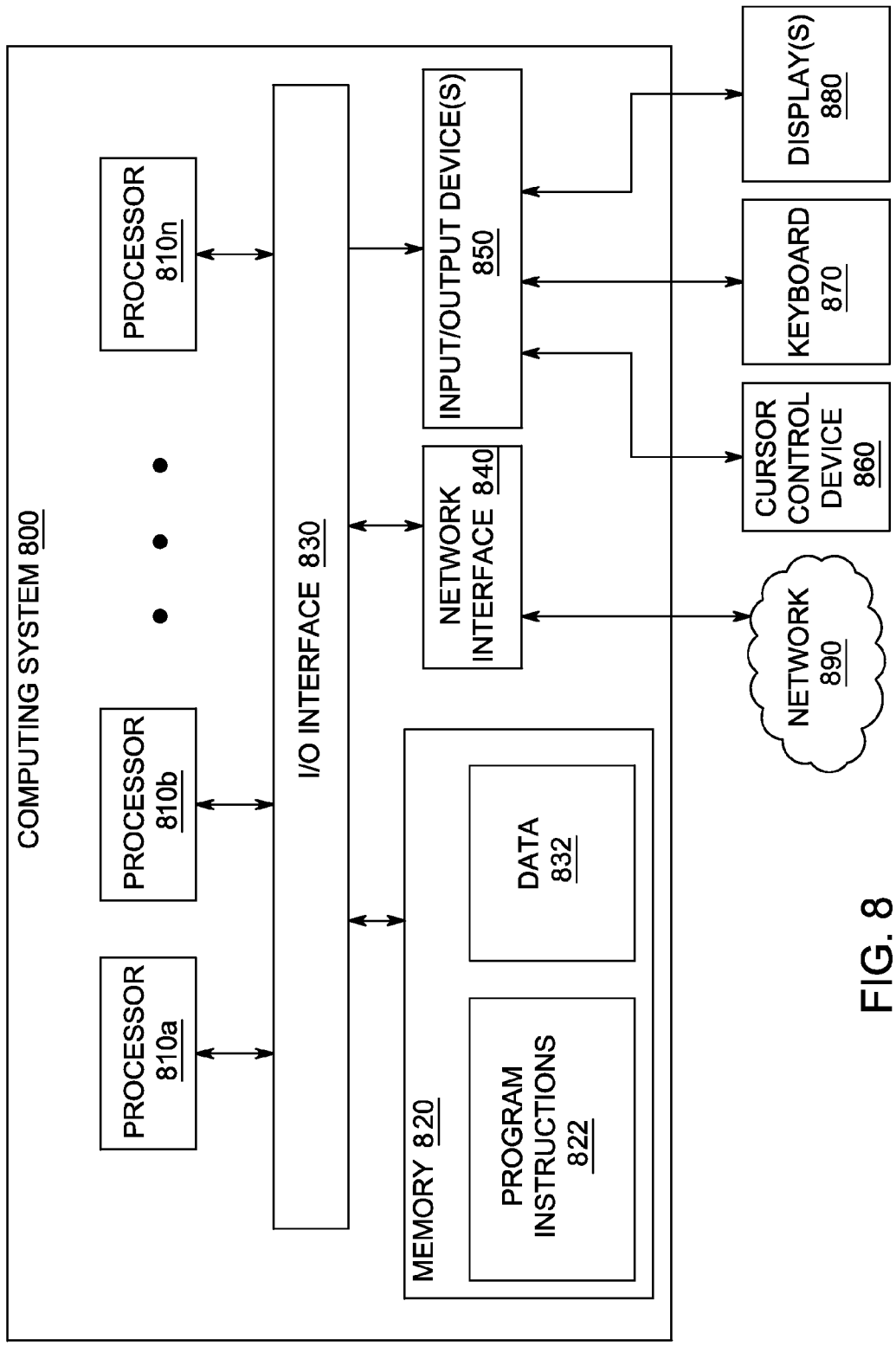

METHOD AND APPARATUS FOR ONE-STEP SIGNATURE TRUST FOR DIGITALLY-SIGNED DOCUMENTS

BACKGROUND OF THE INVENTION

1. Field of the Invention

Embodiments of the present invention generally relate to digital signatures and, more particularly, to a method and apparatus for one-step signature trust for digitally-signed documents.

2. Description of the Related Art

Digital documents can make use of digital signatures. Digital signatures contain a "certificate" component confirming the identity of the signer and a "signature" component based on the Public Key Infrastructure, PKI, processing of the document content, useful for confirming the integrity of the document content. Often, the digital certificate is issued by a Certificate Authority (CA) such as VeriSign®, and links the identity of the signer to ownership of a unique public key. However, in the case of a signature using a self-signed certificate, the certificate is issued directly by the signer. For a variety of reasons, one or more digital signatures within a document may fail integrity checks when the document is opened by its recipient.

Often, a recipient will open a digitally signed document and receive a warning that the signature status of the document is unknown. Although digital signatures are a more reliable mechanism for identifying and certifying the signer of a document than a traditional paper "wet signature", failures like this undercut a recipient's perception of trust in the individual or organization who provided the document, as well as the recipient's trust in the software application providing the document as a conduit for reliable, trustable, digital documents.

In many cases, the only reason for a document to receive an unknown signature status is that the document was signed using a digital certificate that was not trusted for signing on the recipient's machine. This is particularly prevalent in cases of self-signed documents, that is, documents where the digital certificate included within the digital signature is not rooted in any Certificate Authority (CA). It also occurs when a CA is inaccessible, which occurs when a certificate has a chain of CAs that extend beyond itself but is unreachable for various reasons (e.g., network outage, a private CA that is internal to an organization, server problems at the CA, national calamity, etc.) Current software applications do a poor job of dealing with this failure mode; they simply present an error message and expect the recipient to resolve it, typically with little or no guidance about how to do so.

Therefore, there is a need for a method and apparatus for one-step signature trust for digitally-signed documents.

SUMMARY OF THE INVENTION

Embodiments of the present invention generally relate to a method for one-step signature trust for digitally-signed documents. The method comprises determining whether a digital signature is otherwise valid except for a lack of trust in a digital certificate. The method offers a recipient the option to establish trust in the digital certificate. If the recipient chooses to establish trust in the digital certificate, the method adds the digital certificate to a list of the recipient's trusted digital certificates.

BRIEF DESCRIPTION OF THE DRAWINGS

FIG. 8 depicts a computer system that can be utilized in various embodiments of the present invention, according to one or more embodiments.

Figure 1:
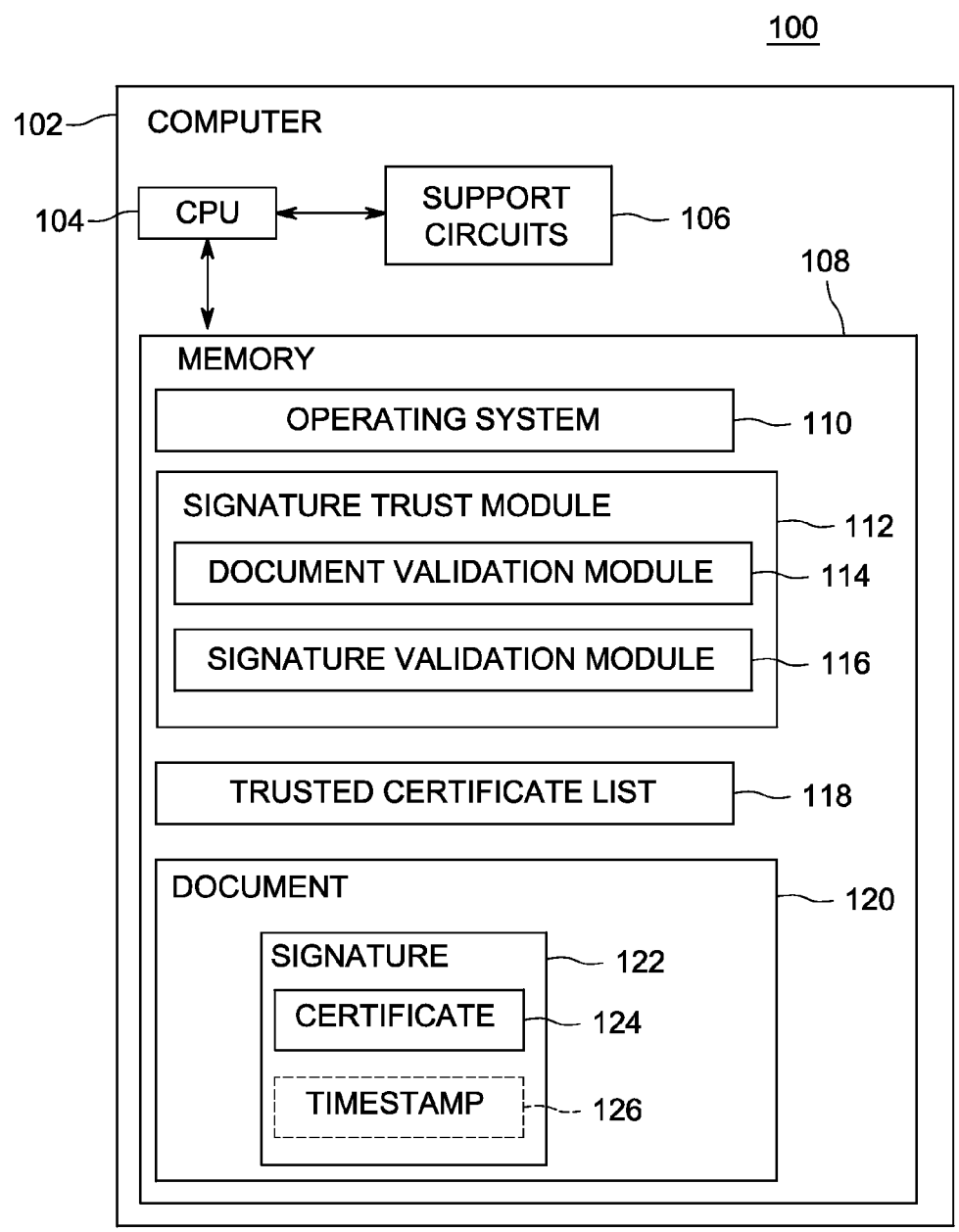
FIG. 1 is a block diagram of a system for one-step signature trust for digitally signed documents, according to one or more embodiments.

While the method and apparatus is described herein by way of example for several embodiments and illustrative drawings, those skilled in the art will recognize that the method and apparatus for one-step signature trust for digitally-signed documents is not limited to the embodiments or drawings described. It should be understood, that the drawings and detailed description thereto are not intended to limit embodiments to the particular form disclosed. Rather, the intention is to cover all modifications, equivalents and alternatives falling within the spirit and scope of the method and apparatus for a one-step signature trust for digitally-signed documents defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to. Furthermore, the words "signature" and "signatures" may both mean one or more individual signatures in single a document.

DETAILED DESCRIPTION OF EMBODIMENTS

Embodiments of the present invention comprise a method and apparatus for one-step signature trust for digitally-signed documents. The embodiments validate a document's integrity when the document is opened. This validation process determines whether the document has been tampered with since it was signed, whether any digital certificates were revoked at the time of signing, and whether any optional timestamps in the document are valid. If the validation process finds the document has not been impermissibly altered since it was signed, no digital certificates were revoked at the time of signing, and any timestamps in the document are valid, a second validation process determines whether each signature in the document is otherwise valid, except for trust in a certificate. For each signature that is otherwise valid except for a trust in a certificate, the method presents the recipient with the option to establish trust in the digital certificate. Should the user choose to establish trust in the certificate, the certificate is added to the recipient's list of trusted certificates Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

FIG. 1 is a block diagram of a system 100 for one-step signature trust for digitally signed documents, according to one or more embodiments. The system 100 comprises a computer 102. The computer 102 comprises a Central Processing Unit (CPU) 104, support circuits 106, and a memory 108. The CPU 104 may comprise one or more commercially available microprocessors or microcontrollers that facilitate data processing and storage. The various support circuits 106 facilitate the operation of the CPU 104 and include one or more clock circuits, power supplies, cache, input/output circuits, and the like. The memory 108 comprises at least one of Read Only Memory (ROM), Random Access Memory (RAM), disk drive storage, optical storage, removable storage and/or the like.

The memory 108 comprises an Operating System 110, a signature trust module 112, a list of trusted certificates 118, and a document 120. The operating system 110 may comprise various commercially known operating systems. The signature trust module 112 comprises a document validation module 114 and a signature validation module 116. The document 120 comprises at least one digital signature 122 which is certified by at least one certificate 124 and may optionally include a timestamp 126.

As described in detail with respect to FIG. 2 below, the signature trust module 112 performs a document validation and a signature validation. When a recipient opens a digitally signed document 120, the document validation module 114 performs a validation on the document 120 as described in detail with respect to FIG. 3 below. The document validation module 114 determines for each signature 122 in the document 120, whether the document 120 has been tampered with since the document 120 was signed. The document validation module 114 also determines whether the document 120 is self-signed, meaning its certificate 124 is signed by the same person who signed the document 120. The signature 122 has at least one certificate 124. For a document 120 that is not self-signed, the document validation module 114 determines if the signature 122 is linked to a trusted root certification authority and if so, whether the certificate 124 was valid at the time the document 120 was signed. Finally, the document validation module 114 determines whether the document 120 has certified timestamp 126 for the signature 122 and if so, determines whether the timestamp 126 is linked to a trusted root authority as well. The document validation module 114 iterates for every signature 122 in the document 120.

When it is determined that the document has not been tampered with, all certificates were valid at the time of signing, and all timestamps are valid, the signature trust module 112 performs a signature validation, as described in detail with respect to FIG. 4 below. The signature validation module 116 performs a validation for each signature 122 in the document 120. The signature validation module 116 determines whether a digital signature 122 is valid except for a lack of trust in the signer's certificate 124. The signature trust module 112 offers the recipient the option of establishing trust in the signer's certificate 124. If the recipient chooses to establish trust, the signer's certificate 124 is added to the recipient's list of trusted certificates 118. When validation is complete for the signature 122 in the document 120, the signature trust module 112 repeats the document validation as described in detail in FIG. 3 below, in order to determine if there are other digital signatures 122 in the document 120 that are otherwise valid except for a lack of a trusted certificate 124. The method iterates until all the digital certificates 124 of all of the digital signatures 122 have been added to the list of trusted certificates 118 or until the recipient chooses not to trust a certificate 124.

Figure 2:
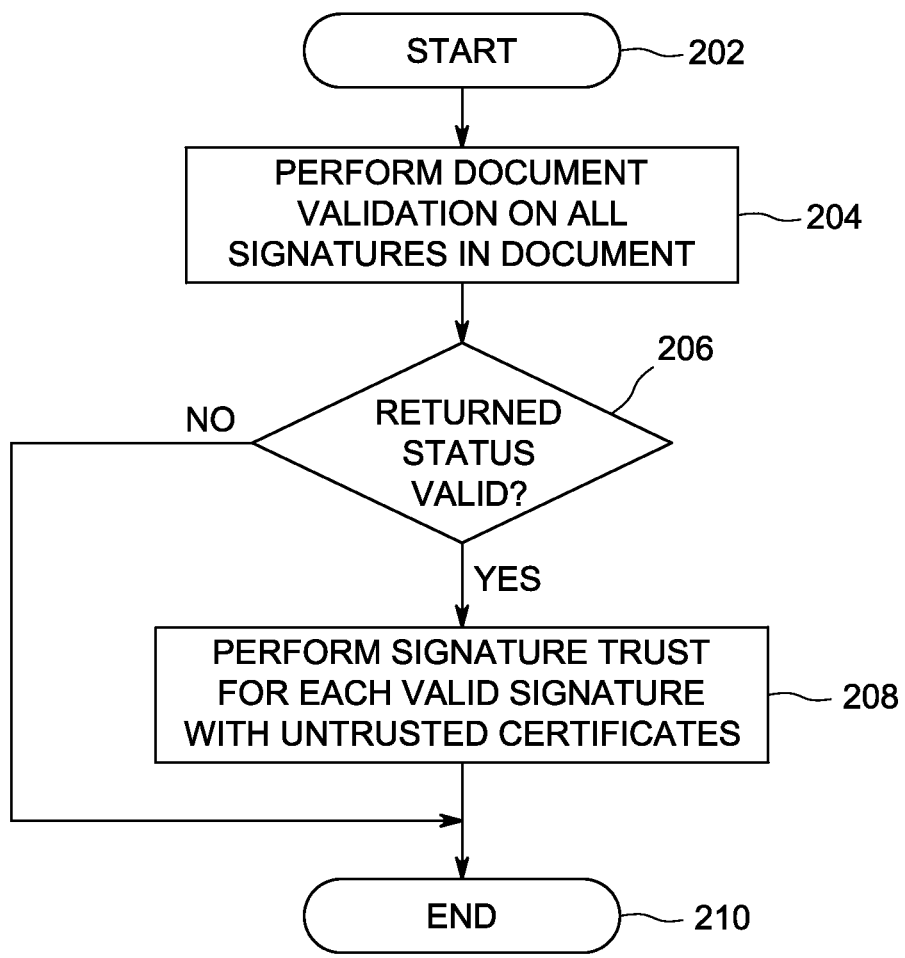
FIG. 2 depicts a flowchart of a method for enabling one-step signature trust as performed by the signature trust module of FIG. 1, according to one or more embodiments.

FIG. 2 depicts a flowchart of a method 200 for enabling one-step signature trust as performed by the signature trust module 112 of FIG. 1, according to one or more embodiments.

The method 200, according to one embodiment, upon the opening of a digitally signed document, performs a one-step signature trust. The method 200 performs a validation on the document to determine whether the document has been tampered with since it was signed and then method 200 performs a validation of the signatures in the document. If the document has not been tampered with and the signatures are otherwise valid except for a lack of trust in the signer's certificate, the method 200 performs another validation on each signature of the document. If otherwise valid except for a trusted digital certificate, the method 200 provides the recipient with an option to establish trust with the signer and add the certificate to the recipient's list of trusted certificates.

The method 200 starts at step 202, and proceeds to step 204. At step 204, the method 200 performs a validation on the document, as described in more detail in FIG. 3. This validation determines whether any content in the document has been tampered with since it was signed (that is, modified in a manner that was not permitted by the signer). The method 200 determines whether certificates for any non-self-signed signatures are linked to a trusted anchor and whether the signature was valid at the time of signing. For self-signed certificates, the method 200 determines whether the certificate is included in the list of trusted certificates. The method 200 proceeds to step 206.

At step 206, the method 200 evaluates the status returned from the document validation. If the status is INVALID, it means either the document has been impermissibly altered since it was signed, a certificate was not valid at the time the document was signed, or a timestamp in the document was found to be not valid. The method 200 proceeds to step 210 and ends. If, at step 206, the method 200 determines the status returned from the document validation is VALID, it means the document has not been tampered with, all signatures with certificates are trusted and were valid at the time of signing and any timestamps, if present, have been verified. The method 200 proceeds to step 208.

Figure 4:
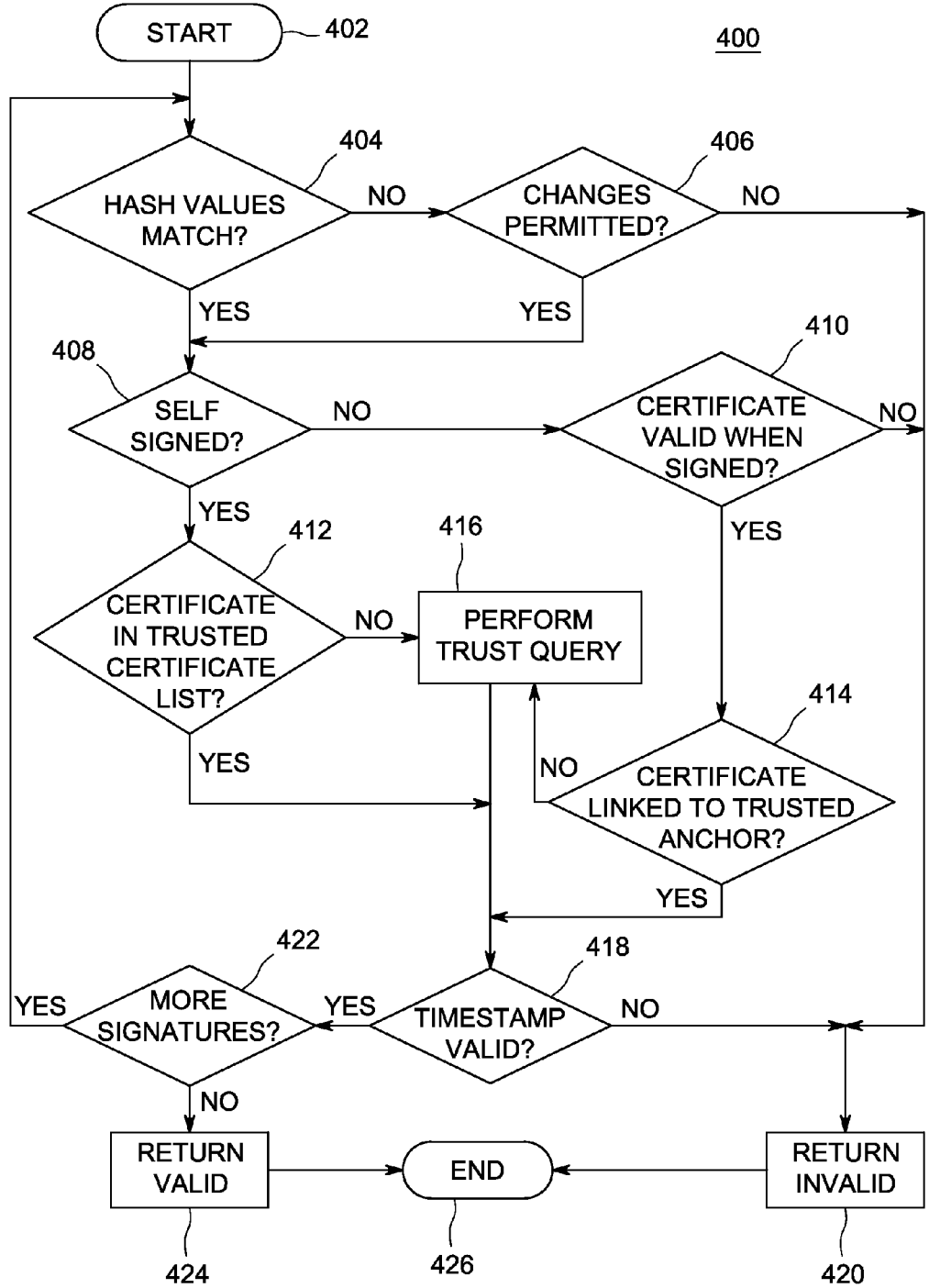
FIG. 4 depicts a flowchart of a method for performing a validation on each signature in the document as performed by the signature validation module of FIG. 1, according to one or more embodiments.

At step 208, the method 200 performs a validation on each signature in the document as described in more detail in FIG. 4. For each signature that is otherwise valid except for a trusted certificate, the method 200 advises the recipient of the situation and provides a mechanism that allows the recipient to select in order to establish trust with the signer's certificate. The method 200 proceeds to step 210 and ends.

Figure 3:
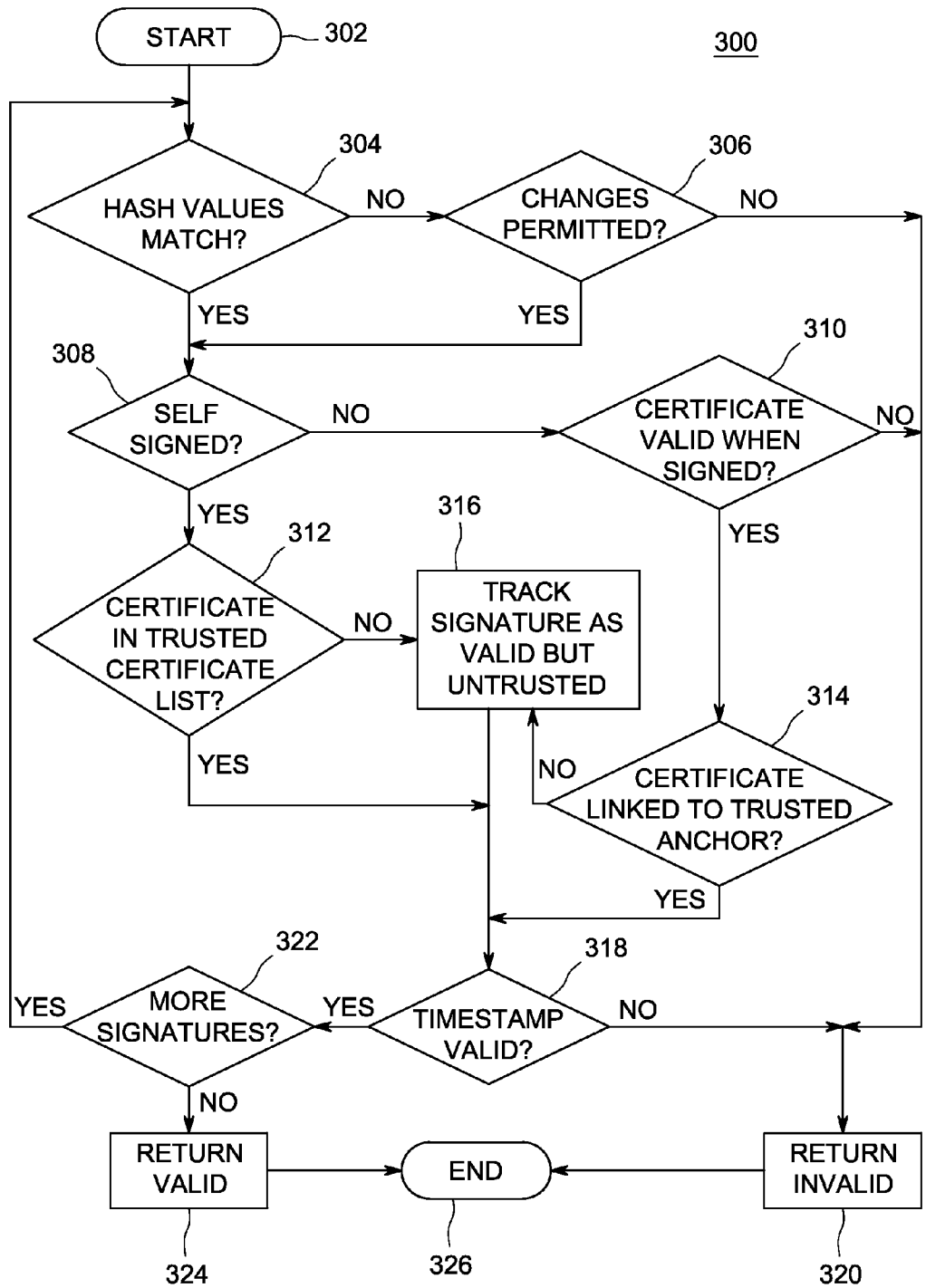
FIG. 3 depicts a flowchart of a method for performing a validation on the document as performed by the document validation module of FIG. 1, according to one or more embodiments.

FIG. 3 depicts a flowchart of a method 300 for performing a validation on the document as performed by the document validation module 114 of FIG. 1, according to one or more embodiments.

The method 300 validates the trustworthiness of the document content since it was signed. The method 300 determines whether any content in the document has been tampered with since it was signed (that is, modified in a manner that was not permitted by the signer). The method 300 determines whether certificates for any non-self-signed signatures are linked to a trusted anchor and whether the signature was valid at the time of signing. For self-signed certificates, the method 300 determines whether the certificate is included in the list of trusted certificates.

The method 300 starts at step 302 and proceeds to step 304. At step 304, the method 300 determines if the document has been altered since it was signed by performing a cryptographic hash comparison. A hash value is calculated at the time the document is signed. If the document is unchanged since being signed, the hash value calculated at the time the document is opened will be the same. The document as it is now must match either the hash or match the hash plus a plurality of acceptable changes that the signer has decided may be made to the document after signature, i.e., "permitted changes". If the hash values match, the method 300 proceeds to step 308. However, if at step 304, the hash values do not match, the method 300 proceeds to step 306.

At step 306, the method 300 determines whether the changes made are permitted. A signer may declare at signing that certain actions after signing such as adding annotations, filling in form fields, allowing additional signatures, and the like will not invalidate the signature. The document is saved incrementally each time the document is changed and saved after a signature. This incremental version can be compared against the previous version of the file. Thus, beginning with the current version of the document, the changes can be rolled back until arriving at the signed version for the hash comparison, and then rolled forward through the changes to ensure each change is a permitted post-signing operation. If, at step 306, the method 300 determines the changes made are not permitted, the method 300 proceeds to step 320. However, if at step 306, the method 300 determines that the changes made are permissible, the method 300 proceeds to step 308.

At step 308, the method 300 determines whether the document is self-signed. A self-signed document is certified by the same person who signed the document. If the method 300 determines that a document is self-signed, the method 300 proceeds to step 312. At step 312, the method 300 determines if the self-signed signature is included in the list of trusted certificates. If the signature is included in the list, the method 300 proceeds to step 318. If the signature is not included in the list of trusted certificates, the method 300 proceeds to step 316. At step 316, the method 300 tracks the signature as having a status of valid, but untrusted. The method 300 proceeds to step 318. If, at step 308, the method 300 determines the document is not self-signed, the method 300 proceeds to step 310.

At step 310, the method 300 determines whether the certificate was valid at the time the document was signed. A signer's certificate may be certified by a local Certificate Authority (CA). A local CA may be signed by a higher CA, which may be signed by an even higher CA, and so on up to a root, or anchor, CA, which is the highest level certificate. This is referred to as a certification chain. A signature will be invalid if any certificate in the chain was revoked at the time the document was signed. Certificates may be revoked if the certificate's security has been compromised or if the owner of the signature has left a company. One skilled in the art will appreciate the various methods for revocation checking. If the certificate was not valid at the time of signing, the method 300 proceeds to step 320. If the method 300 determines the certificate was valid at the time it was signed, the method 300 proceeds to step 314.

At step 314, the method 300 determines if the certificate chain links to a trusted anchor. A certificate is trusted if it is in a recipient's list of trusted certificates or a CA verifies the certificate. A certificate may be found to be untrusted if the CA is unreachable for various reasons (e.g., network outage, a private CA that is internal to an organization, server problems at the CA, etc.) If the method 300 determines the certificate does not link to a trusted anchor, the method 300 proceeds to step 316. At step 316, the method 300 tracks the signature as having a status of valid, but untrusted. The method 300 proceeds to step 318. If at step 314, the method 300 determines the certificate chain links to a trusted anchor, the method 300 proceeds to step 318.

At step 318, the method 300 determines whether an optional timestamp associated with the signature is valid. The timestamp has a certificate as well and the timestamp's certificate is validated in the same manner as the above described certificate. If the method 300 determines the timestamp is not valid, i.e. the certificate chain does not link to a trusted anchor or the certificate was not valid at the time of the timestamp, the method 300 proceeds to step 320. At step 320, the method 300 returns a status of INVALID. The method 300 proceeds to step 326 and ends.

If, however, at step 318, the timestamp is determined to be valid, the method 300 proceeds to step 322. At step 322, the method 300 determines if there are any additional signatures in the document. If the method 300 determines there are additional signatures in the document, the method 300 proceeds to step 304. The method 300 then iterates until all signatures in the document have been validated. However, if at step 322 the method 300 determines there are no additional signatures in the document to be validated the method 300 proceeds to step 324. At step 324, the method 300 returns a status of VALID. The method 300 proceeds to step 326 and ends.

FIG. 4 depicts a flowchart of a method for performing a validation on each signature in the document as performed by the signature validation module 116 of FIG. 1, according to one or more embodiments. The method 400 performs the same validation for each signature in the document as performed in method 300, with corresponding steps incremented by 100. However, at step 316, where method 300 tracks a signature as valid untrusted, the method 400, at step 416 performs a trust query, which offers the recipient the option of establishing trust in the signer's certificate, as described in more detail in FIG. 5.

Figure 5:
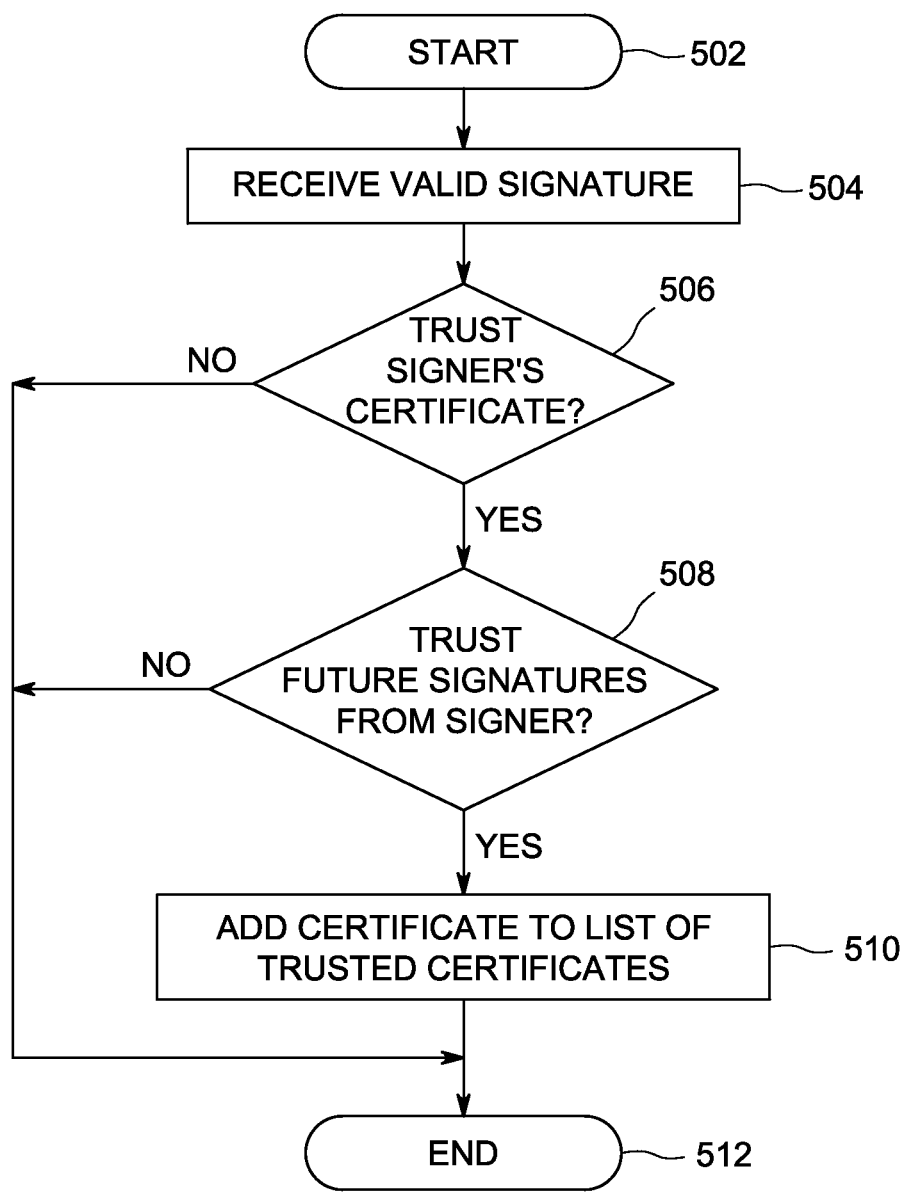
FIG. 5 depicts a flowchart of a method for performing a signature trust as performed by the signature trust module of FIG. 1, according to one or more embodiments.

FIG. 5 depicts a flowchart of a method 500 for performing a signature trust as performed by the signature trust module 112 of FIG. 1, according to one or more embodiments. The method 500 offers the recipient the option of establishing trust in a signer's certificate.

Figure 6:
FIG. 6 depicts the trust message option and button for trusting a signature, as displayed by the signature trust module of FIG. 1, according to one or more embodiments.
Figure 7:
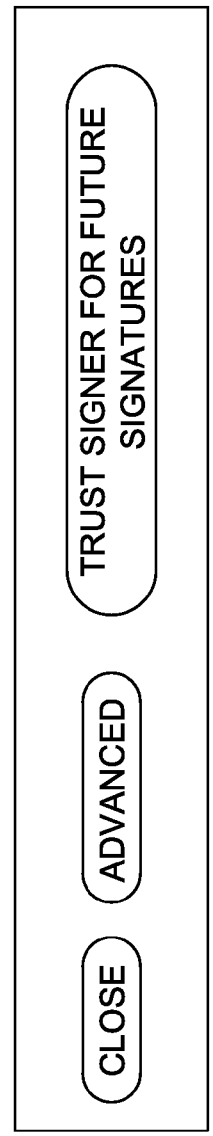
FIG. 7 depicts the trust button for trusting a certificate for future signatures, as displayed by the signature trust module of FIG. 1, according to one or more embodiments.

The method 500 begins at 502 and proceeds to step 504. At step 504, the method 500 receives a signature that is valid except for trust in the signature's certificate. The method 500 proceeds to step 506. At step 506, the method 500 presents the users with a verbose message advising the user of the situation and providing a button that allows the user to establish trust in the signer's certificate. An exemplary embodiment of this message is depicted in FIG. 6 below. At step 506, if the recipient chooses not to trust the signer's certificate, the method 500 proceeds to step 512 and ends. If at step 506, the recipient chooses to establish trust with the signer's certificate, the method 500 proceeds to step 508. At step 508, the method 500 presents the recipient with basic information about the signer and a selectable button to verify that the recipient wants to trust the signer for future signatures. An exemplary embodiment of this message is depicted in FIG. 7 below. If the recipient selects the button to establish trust in that signer for future signatures, the method 500 proceeds to step 510. At step 510, the signer's certificate is added to the recipient's list of trusted certificates. The method 500 proceeds to step 512 and ends. If, at step 508, the recipient chooses not to establish trust for future signatures, the method 500 proceeds to step 512 and ends.

FIG. 6 depicts the trust message option and button for trusting a signature, as displayed by the signature trust module 112 of FIG. 1, according to one or more embodiments. The message informs the user that a signature is valid, but has yet to be trusted and offers a button for the recipient to select in order to establish trust.

FIG. 7 depicts the trust button for trusting a certificate for future signatures, as displayed by the signature trust module 112 of FIG. 1, according to one or more embodiments. Should the recipient choose to trust the signer, the certificate will be added to the recipient's list of trusted certificates.

The embodiments of the present invention may be embodied as methods, apparatus, electronic devices, and/or computer program products. Accordingly, the embodiments of the present invention may be embodied in hardware and/or in software (including firmware, resident software, micro-code, etc.), which may be generally referred to herein as a "circuit" or "module". Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device. These computer program instructions may also be stored in a computer-usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium include the following: hard disks, optical storage devices, a transmission media such as those supporting the Internet or an intranet, magnetic storage devices, an electrical connection having one or more wires, a portable computer diskette, a random access memory (RAM), a read-only memory (ROM), an erasable programmable read-only memory (EPROM or Flash memory), an optical fiber, and a compact disc read-only memory (CD-ROM).

Computer program code for carrying out operations of the present invention may be written in an object oriented programming language, such as Java®, Smalltalk or C++, and the like. However, the computer program code for carrying out operations of the present invention may also be written in conventional procedural programming languages, such as the "C" programming language and/or any other lower level assembler languages. It will be further appreciated that the functionality of any or all of the program modules may also be implemented using discrete hardware components, one or more Application Specific Integrated Circuits (ASICs), or programmed Digital Signal Processors or microcontrollers.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

Example Computer System

FIG. 8 depicts a computer system that can be utilized in various embodiments of the present invention, according to one or more embodiments.

Various embodiments of an apparatus and method for providing one-step signature trust for digitally-signed documents, as described herein, may be executed on one or more computer systems, which may interact with various other devices. One such computer system is computer system 800 illustrated by FIG. 8, which may in various embodiments implement any of the elements or functionality illustrated in FIGS. 1-7. In various embodiments, computer system 800 may be configured to implement methods described above. The computer system 800 may be used to implement any other system, device, element, functionality or method of the above-described embodiments. In the illustrated embodiments, computer system 800 may be configured to implement methods 200, 300, 400 and 500, as processor-executable executable program instructions 822 (e.g., program instructions executable by processor(s) 810$a$-$n$) in various embodiments.

In the illustrated embodiment, computer system 800 includes one or more processors 810$a$-$n$ coupled to a system memory 820 via an input/output (I/O) interface 830. The computer system 800 further includes a network interface 840 coupled to I/O interface 830, and one or more input/output devices 850, such as cursor control device 860, keyboard 870, and display(s) 880. In various embodiments, any of components may be utilized by the system to receive recipient input described above. In various embodiments, a user interface may be generated and displayed on display 880.

In some cases, it is contemplated that embodiments may be implemented using a single instance of computer system 800, while in other embodiments multiple such systems, or multiple nodes making up computer system 800, may be configured to host different portions or instances of various embodiments. For example, in one embodiment some elements may be implemented via one or more nodes of computer system 800 that are distinct from those nodes implementing other elements. In another example, multiple nodes may implement computer system 800 in a distributed manner.

In different embodiments, computer system 800 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In various embodiments, computer system 800 may be a uniprocessor system including one processor 810, or a multiprocessor system including several processors 810 (e.g., two, four, eight, or another suitable number). Processors 810*a*-*n* may be any suitable processor capable of executing instructions. For example, in various embodiments processors 810 may be general-purpose or embedded processors implementing any of a variety of instruction set architectures (ISAs), such as the PowerPC, SPARC, or MIPS ISAs, or any other suitable ISA. In multiprocessor systems, each of processors 810*a*-*n* may commonly, but not necessarily, implement the same ISA.

System memory 820 may be configured to store program instructions 822 and/or data 832 accessible by processor 810. In various embodiments, system memory 820 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing any of the elements of the embodiments described above may be stored within system memory 820. In other embodiments, program instructions and/or data may be received, sent or stored upon different types of computer-accessible media or on similar media separate from system memory 820 or computer system 800.

In one embodiment, I/O interface 830 may be configured to coordinate I/O traffic between processor 810, system memory 820, and any peripheral devices in the device, including network interface 840 or other peripheral interfaces, such as input/output devices 850. In some embodiments, I/O interface 830 may perform any necessary protocol, timing or other data transformations to convert data signals from one components (e.g., system memory 820) into a format suitable for use by another component (e.g., processor 810). In some embodiments, I/O interface 830 may include support for devices attached through various types of peripheral buses, such as a variant of the Peripheral Component Interconnect (PCI) bus standard or the Universal Serial Bus (USB) standard, for example. In some embodiments, the function of I/O interface 830 may be split into two or more separate components, such as a north bridge and a south bridge, for example. Also, in some embodiments some or all of the functionality of I/O interface 830, such as an interface to system memory 820, may be incorporated directly into processor 810.

Network interface 840 may be configured to allow data to be exchanged between computer system 800 and other devices attached to a network (e.g., network 890), such as one or more external systems or between nodes of computer system 800. In various embodiments, network 890 may include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 840 may support communication via wired or wireless general data networks, such as any suitable type of Ethernet network, for example; via telecommunications/telephony networks such as analog voice networks or digital fiber communications networks; via storage area networks such as Fiber Channel SANs, or via any other suitable type of network and/or protocol.

Input/output devices 850 may, in some embodiments, include one or more display terminals, keyboards, keypads, touchpads, scanning devices, voice or optical recognition devices, or any other devices suitable for entering or accessing data by one or more computer systems 800. Multiple input/output devices 850 may be present in computer system 800 or may be distributed on various nodes of computer system 800. In some embodiments, similar input/output devices may be separate from computer system 800 and may interact with one or more nodes of computer system 800 through a wired or wireless connection, such as over network interface 840.

In some embodiments, the illustrated computer system may implement any of the methods described above, such as the methods illustrated by the flowcharts of FIGS. 2, 3, 4, and 5. In other embodiments, different elements and data may be included.

Those skilled in the art will appreciate that computer system 800 is merely illustrative and is not intended to limit the scope of embodiments. In particular, the computer system and devices may include any combination of hardware or software that can perform the indicated functions of various embodiments, including computers, network devices, Internet appliances, PDAs, wireless phones, pagers, etc. Computer system 800 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via intercomputer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 800 may be transmitted to computer system 800 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium or via a communication medium. In general, a computer-accessible medium may include a storage medium or memory medium such as magnetic or optical media, e.g., disk or DVD/CD-ROM, volatile or non-volatile media such as RAM (e.g., SDRAM, DDR, RDRAM, SRAM, etc.), ROM, etc.

The methods described herein may be implemented in software, hardware, or a combination thereof, in different embodiments. In addition, the order of methods may be changed, and various elements may be added, reordered, combined, omitted, modified, etc. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

While the foregoing is directed to embodiments of the present invention, other and further embodiments of the invention may be devised without departing from the basic scope thereof, and the scope thereof is determined by the claims that follow.

The invention claimed is:

1. A computer implemented method for establishing one-step signature trust of digitally signed documents comprising:
    determining via a processor whether a digital signature in a document is otherwise valid except for a lack of status as a previously validated trusted digital certificate that confirms the identity of a signer of the document, wherein determining comprises establishing a certification chain is valid by determining the digital certificate links to a trusted anchor;
    offering a recipient an option to establish trust in the digital certificate; and
    adding the digital certificate to a list of the recipient's trusted digital certificates when a recipient opts to establish the status of the digital certificate as a trusted digital certificate.

2. The method of claim 1, wherein determining further comprises establishing that the document has not been tampered with since the document was signed.

3. The method of claim 2, wherein determining further comprises establishing that only permitted changes were made to the document since the document was signed.

4. The method of claim 1, wherein determining further comprises establishing that the digital signature has not been altered since it was signed.

5. The method of claim 1, wherein offering comprises allowing a recipient to trust the digital certificate in future documents.

6. A non-transient computer readable medium for storing computer instructions that, when executed by at least one processor cause the at least one processor to perform a method one-step signature trust verification of digitally signed documents comprising:
    determining via a processor whether a digital signature in a document is otherwise valid except for a lack of status as a previously validated trusted digital certificate that confirms the identity of a signer of the document, wherein determining comprises establishing a certification chain is valid by determining the digital certificate links to a trusted anchor;
    offering a recipient an option to establish trust in the digital; and
    adding the digital certificate to a list of the recipient's trusted digital certificates when a recipient opts to establish the status of the digital certificate as a trusted digital certificate.

7. The computer readable medium of claim 6, wherein determining further comprises establishing that the document has not been tampered with since the document was signed.

8. The method of claim 7, wherein determining comprises further establishing that only permitted changes were made to the document since the document was signed.

9. The computer readable medium of claim 6, wherein determining further comprises establishing that the digital signature has not been tampered with.

10. The computer readable medium of claim 6, wherein offering comprises allowing a recipient to trust the digital certificate in future documents.

11. An apparatus for one-step signature trust of digital signatures including non-transitory computer readable medium storing modules, the modules comprising:
    a document validation module for validating the overall status of a document;
    a signature validation module for determining whether a digital signature in a document is otherwise valid except for a lack of status as a previously validated trusted digital certificate that confirms the identity of a signer of the document, wherein determining further comprises establishing a certification chain is valid by determining the digital certificate links to a trusted anchor; and
    a signature trust module for offering a recipient an option to establish a trust status in the digital certificate.

12. The apparatus of claim 11, wherein the signature trust module further comprises adding the digital certificate to a list of the recipient's trusted digital certificates.

13. The apparatus of claim 11, wherein determining further comprises establishing that only permitted changes were made to the document since the document was signed.

14. The apparatus of claim 11, wherein determining further comprises establishing that a document has not been tampered with since the document was signed.

15. The apparatus of claim 11, wherein determining further comprises establishing that the digital signature has not been tampered with.

16. The apparatus of claim 11, wherein offering comprises allowing a recipient to change the trust status of the digital signature of the digital certificate in future documents.

17. The apparatus of claim 11, wherein the document validation module and signature validation module each perform a cryptographic hash comparison.

* * * * *